No. 609,316. Patented Aug. 16, 1898.
I. ZAWIEJSKI.
ARRANGEMENT FOR PRODUCING WATER WALLS ON OUTSIDE OF BUILDINGS.
(Application filed Dec. 14, 1897.)
(No Model.)
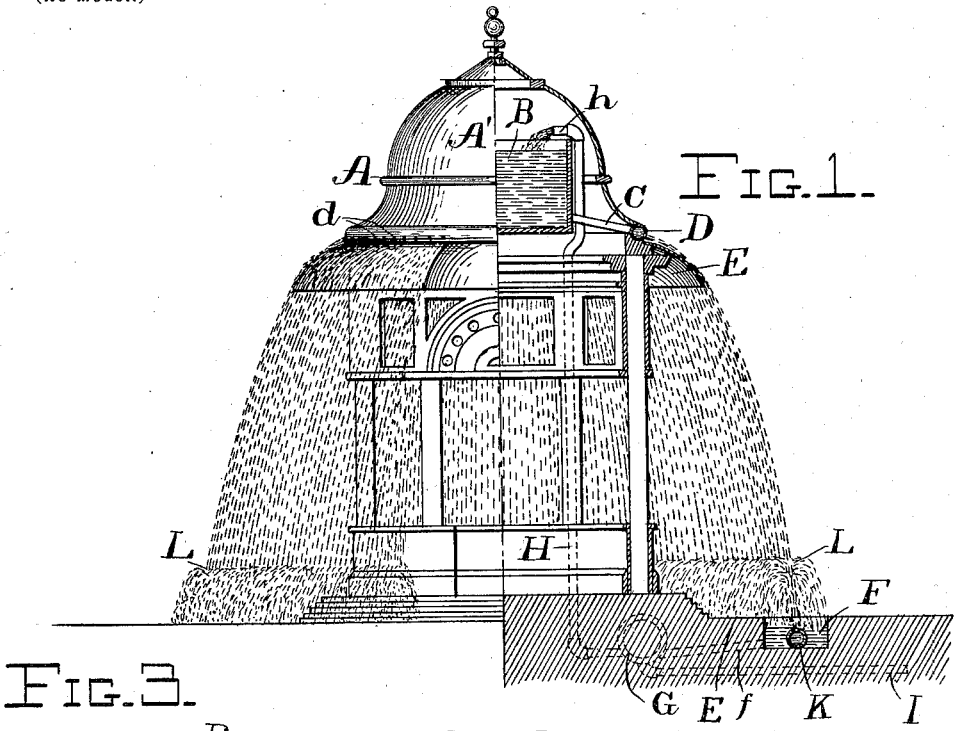
Fig. 1.
Fig. 3.
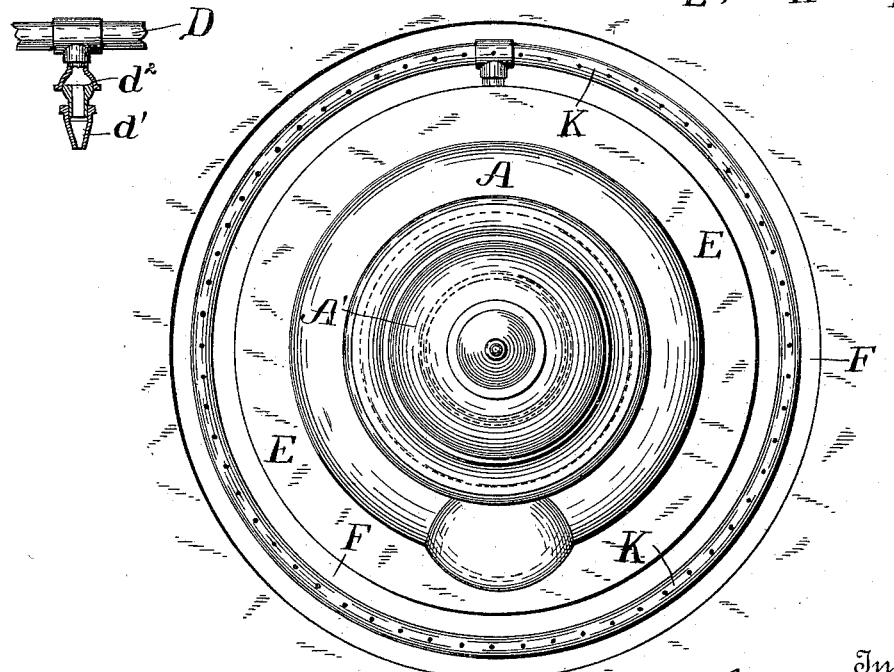
Fig. 2.
Witnesses
L. H. Blakelock.
Percy C. Bowen.
Inventor
I. Zawiejski
by Wilkinson & Fisher.
Attorneys

UNITED STATES PATENT OFFICE.

IAN ZAWIEJSKI, OF VIENNA, AUSTRIA-HUNGARY.

ARRANGEMENT FOR PRODUCING WATER WALLS ON OUTSIDE OF BUILDINGS.

SPECIFICATION forming part of Letters Patent No. 609,316, dated August 16, 1898.

Application filed December 14, 1897. Serial No. 661,895. (No model.)

*To all whom it may concern:*

Be it known that I, IAN ZAWIEJSKI, architect, a citizen of Austria-Hungary, residing at No. 25 Löwengasse, Vienna, Austria-Hungary, have invented certain new and useful Improvements in Arrangements for Producing Water Walls on the Outside of Buildings; and I do hereby declare the following to be a full, clear, and exact description of the invention, such as will enable others skilled in the art to which it appertains to make and use the same.

My invention relates to an arrangement for producing a water wall on the outside of buildings; and it consists in arranging at the desired or suitable parts of the building pipes provided with perforations, nozzles, or roses and supplied with water from any suitable source. The water-jets on issuing from such perforations, nozzles, or roses expand and run into each other, and thus form a substantially smooth and continuous wall more or less resembling a glass bell, from which no drop of water falls inside. This wall offers a considerable resistance to wind and rain, so that under such a water bell persons are in a uniformly cool and humid atmosphere without any danger of getting wet. Such water walls are also particularly adapted for decorative purposes, and the decorative effect may be increased by using electric light, as in the well-known "Fontaine lumineuse."

In the accompanying drawings, Figure 1 is an elevation, partly in section, of a pavilion provided with my improved arrangement. Fig. 2 is a plan thereof. Fig. 3 is a detail view, partly in section, of one of the adjustable nozzles.

A designates the pavilion or building, which may be of any suitable shape and is preferably provided with a dome A', in which is supported a tank or reservoir B to hold a supply of water.

A pipe H, leading from any suitable water-supply or from a pump, as indicated in dotted lines at G, is arranged to supply water to the reservoir B, as shown at $h$, and if a pump is used it is connected with any suitable water-source (not shown) by a pipe I. (Shown by dotted lines in Fig. 1 of the drawings.)

Around the top of the pavilion, below the dome A' and a little below the bottom of the reservoir B, is arranged a pipe D, perforated, as at $d$, and connected with the said reservoir by one or more pipes C.

The pipe D is arranged just above a downwardly-curved surface or "marquise" E, which extends around the pavilion in the place of the usual eaves and serves to receive the streams of water from the perforations $d$ and allow them to run together and form a thin sheet of water, which will fall around the pavilion in the form of a bell, as shown in Fig. 1, thus inclosing the building in a clear sheet of water, which will admit light, but will in a great measure keep off the heat and prove a considerable protection against wind and rain.

A channel or drain F is arranged around the building to receive the water as it falls and to conduct it away. This channel may be advantageously connected with the pump G by a pipe $f$, so that the water from the said channel may be pumped back into the reservoir B and used continuously.

A pipe K may be arranged in the channel F and connected with the reservoir B or other water-supply in any suitable manner, the said pipe K being perforated along its upper side to allow jets of water to rise therefrom and meet the water falling from the pipe D, thus forming a line of spray around the building where the two streams meet, as at L.

In place of the perforations in the pipes D and K, I may use nozzles $d'$, (shown in detail in Fig. 3 of the drawings,) which nozzles are connected to the said pipes by universal joints $d^2$, so that they may be placed at any inclination, and so vary the form of the sheet of water as it falls.

It will be obvious that I may construct the building with several stories and provide some or all of them with the water bell, as herein described.

Having thus described my invention, what I claim, and desire to secure by Letters Patent of the United States, is—

1. In a device of the character described the combination with a building of a pipe D, arranged around the upper portion of the said building, discharge-openings in the said pipe, a curved surface arranged around the said building beneath the said pipe to receive the water therefrom and direct the fall thereof, pipes connecting the said pipe D with a suitable source of water, and a channel surrounding the base of said building to receive the water; substantially as described.

2. In a device of the character described the combination with a building of a pipe D, arranged around the upper portion of the said building, discharge-openings in the said pipe, a curved surface arranged around the said building beneath the said pipe to receive the water therefrom and direct the fall thereof, pipes connecting the said pipe D with a suitable source of water, a channel to receive the water, and a pipe having discharge-openings arranged in the said channel and connected with the water source; substantially as described.

3. In a device of the character described the combination with a building, a reservoir supported in the top of the said building, and means for supplying the said reservoir with water, of a pipe D, arranged around the upper part of the said building, discharge-nozzles in the said pipe, a curved surface arranged around the said building beneath the said nozzles to receive the water therefrom and direct the fall thereof, and pipes connecting the pipe D with the said reservoir, substantially as described.

4. In a device of the character described the combination with a building, a reservoir supported in the top of the said building, and means for supplying the said reservoir with water, of a pipe D, arranged around the upper part of the said building, discharge-nozzles in the said pipe, a curved surface arranged around the said building beneath the said nozzles to receive the water therefrom and direct the fall thereof, pipes connecting the pipe D with the said reservoir, a channel to receive the water and means for returning the water from the channel to the reservoir, substantially as described.

In testimony whereof I affix my signature in presence of two witnesses.

IAN ZAWIEJSKI.

Witnesses:
  HENRY C. CARPENTER,
  CHAS. E. CARPENTER.